T. TURANYCZ.
APPARATUS FOR STRINGING WIRES.
APPLICATION FILED APR. 19, 1917.
1,275,501.
Patented Aug. 13, 1918.
4 SHEETS—SHEET 1.
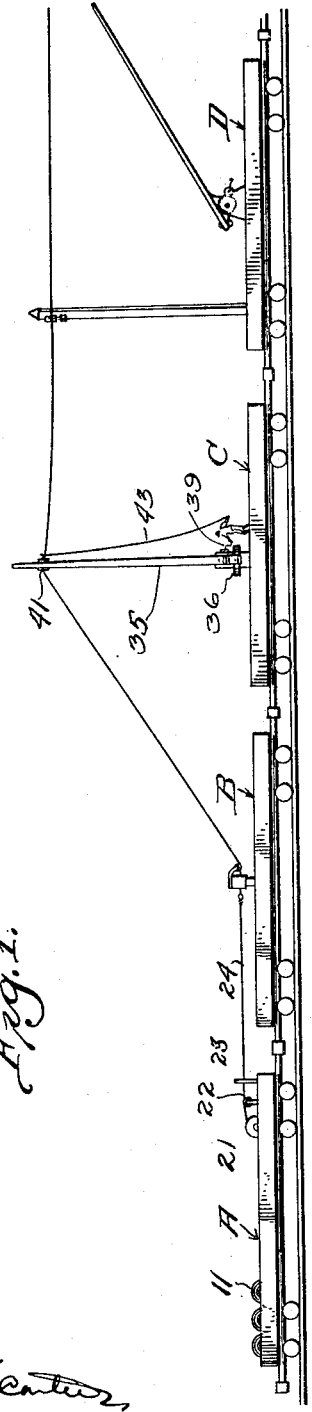
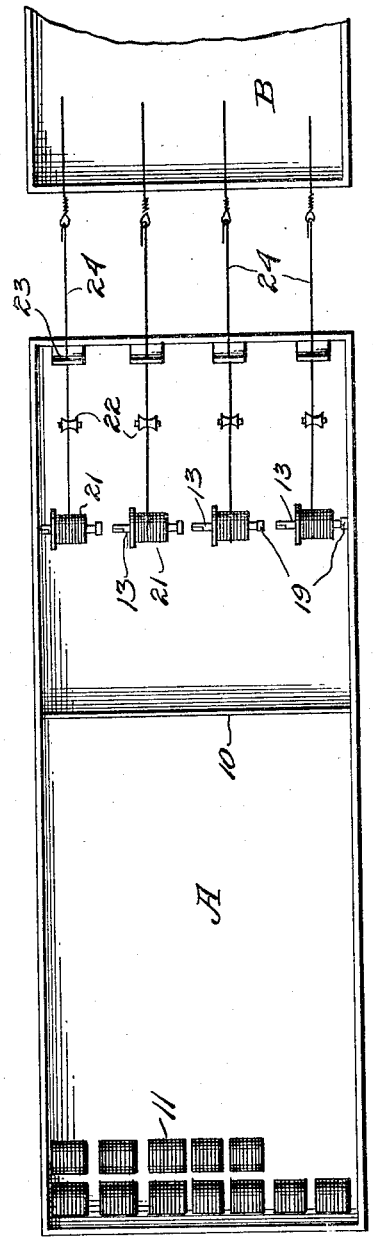
Inventor
T. Turanycz
By R. Morgan Elliott & Co.
Attorneys
Witness

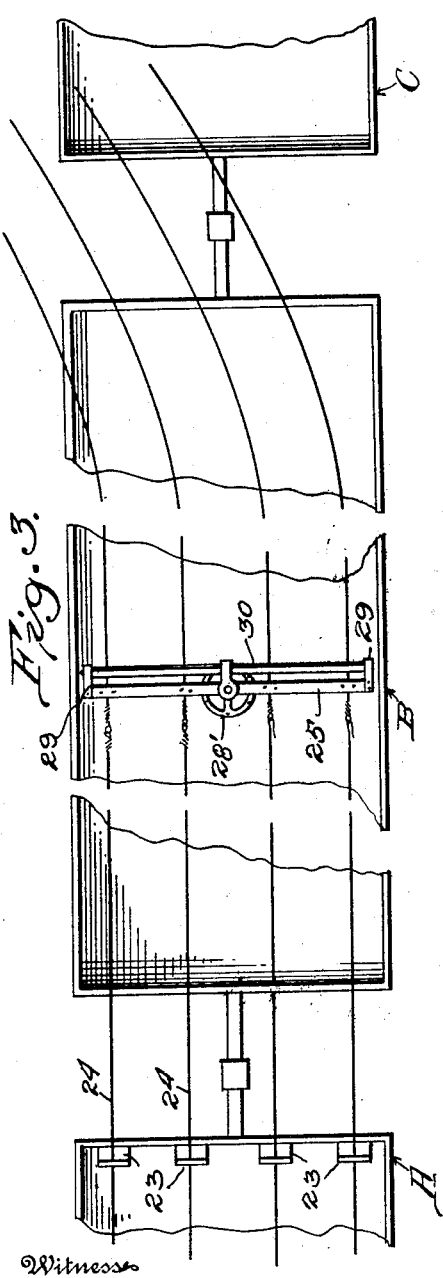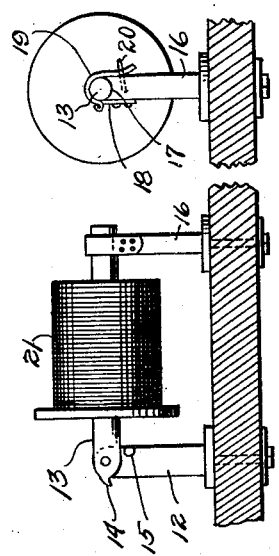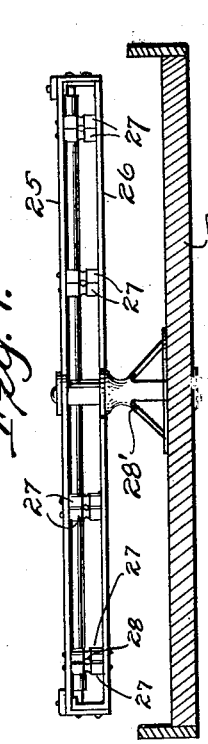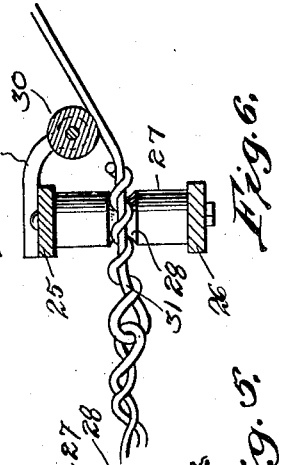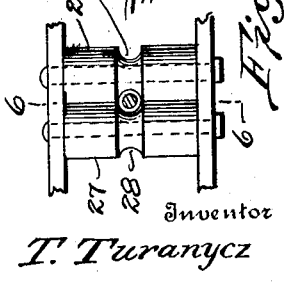

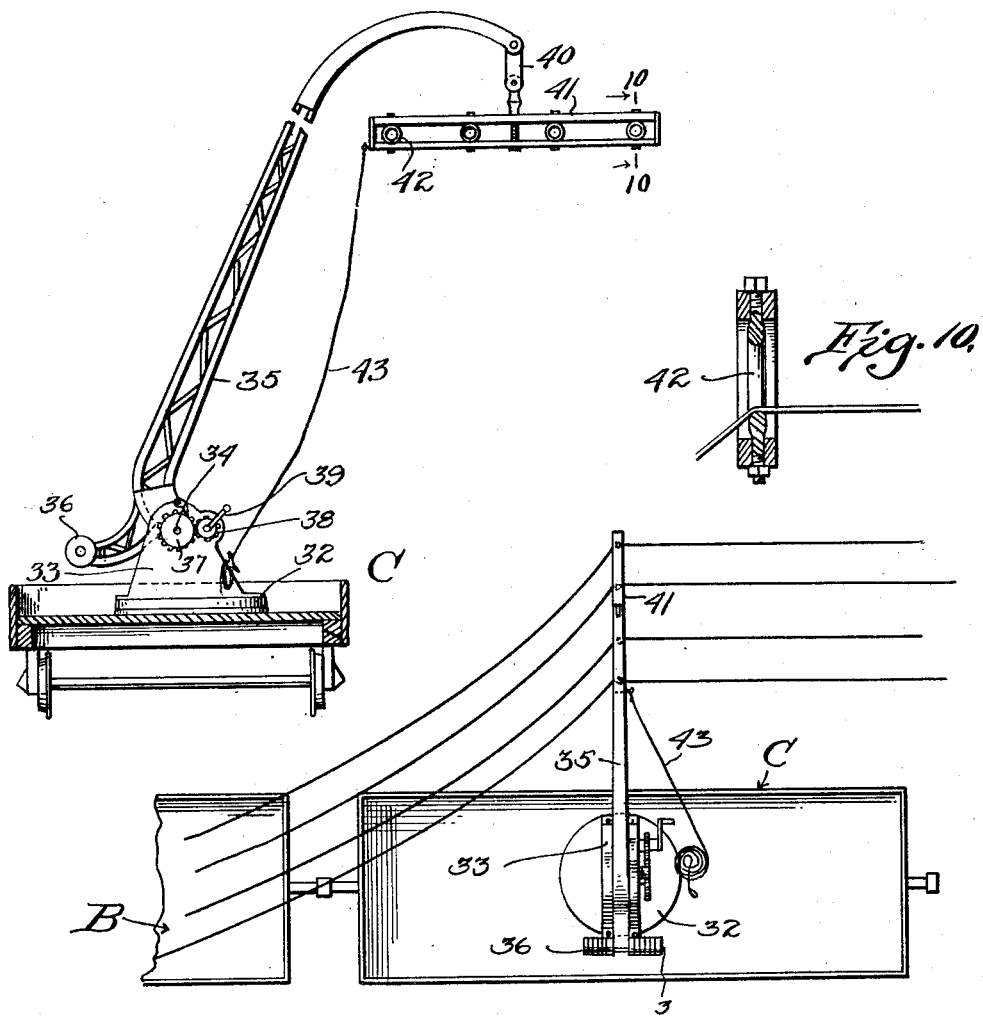

T. TURANYCZ.
APPARATUS FOR STRINGING WIRES.
APPLICATION FILED APR. 19, 1917.
1,275,501.
Patented Aug. 13, 1918.
4 SHEETS—SHEET 4.
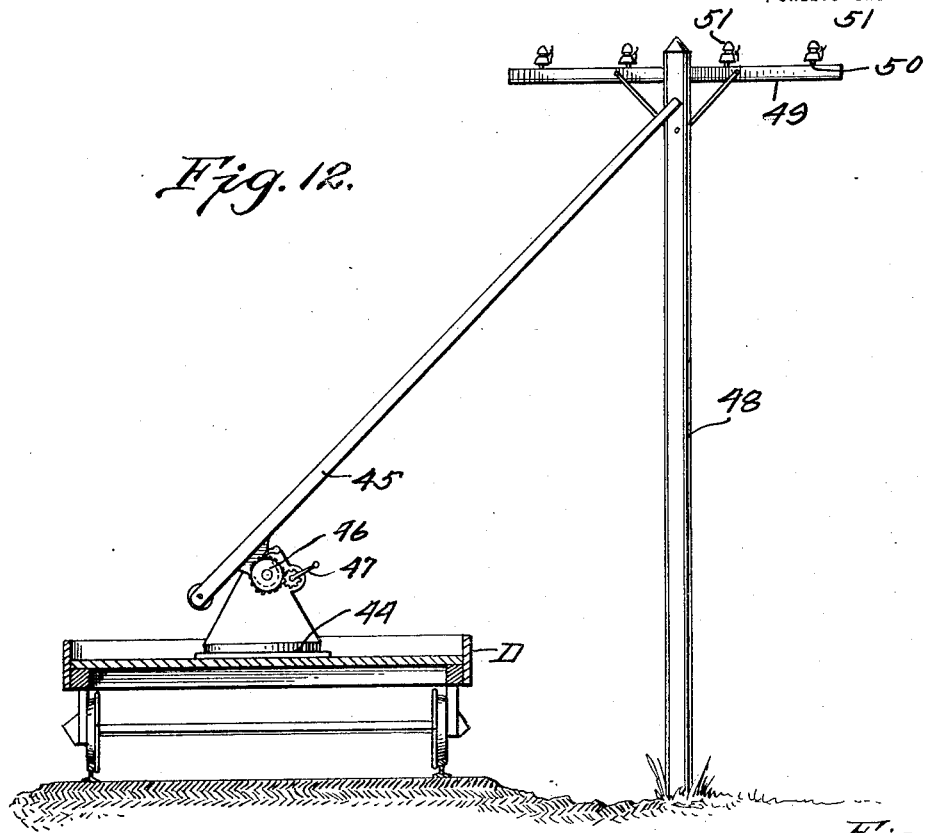
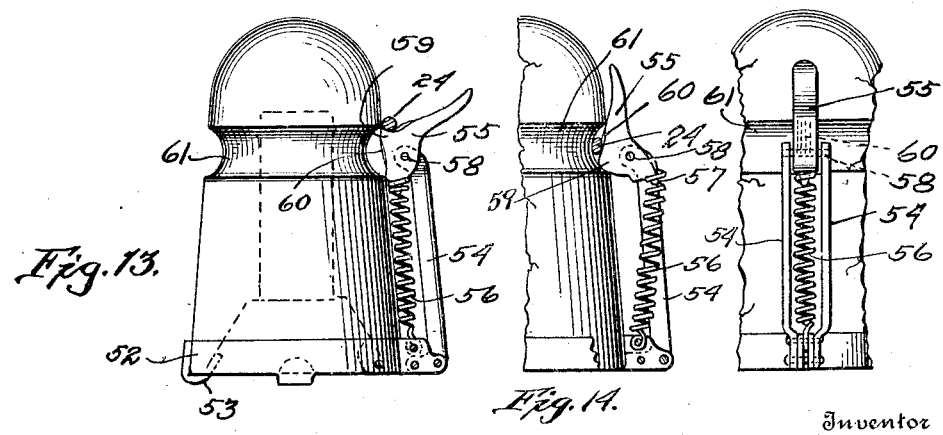
Inventor
T. Turanycz
By R. Morgan Elliott & Co.
Attorneys
Witnesses
D. MacCarter
K. Bazarnicki

UNITED STATES PATENT OFFICE.

THEODORE TURANYCZ, OF GOODEVE, SASKATCHEWAN, CANADA.

APPARATUS FOR STRINGING WIRES.

1,275,501.  Specification of Letters Patent.  Patented Aug. 13, 1918.

Application filed April 19, 1917. Serial No. 163,265.

*To all whom it may concern:*

Be it known that I, THEODORE TURANYCZ, subject of the King of England, residing at Goodeve, in the Province of Saskatchewan and Dominion of Canada, have invented certain new and useful Improvements in Apparatus for Stringing Wires, of which the following is a specification.

This invention relates to electrical transmission lines such as are used for telephones and telegraphs and has special reference to an erecting apparatus for telegraph lines and the like.

One important object of the invention is to provide a novel and improved general construction for devices of this character.

A second important object of the invention is the provision of a line erecting apparatus mounted on a train of railway cars, the apparatus being so arranged that the line may be erected by a continuous movement of the train along the track, it being understood that the poles supporting the line are in their usual arrangement adjacent the track.

A third important object of the invention is the provision of an erecting device of this character wherein splices may be made in the wire, the device being provided with means for compressing the splices so that the spliced portions of the wire will readily pass through the apparatus.

A fourth important object of the invention is the provision of means of novel character for automatically clamping the wires in position on the poles as the apparatus passes alongside the said poles.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a side elevation showing a train of cars provided with this apparatus, one of the telegraph poles being also disclosed, the view being somewhat diagrammatic, details being eliminated.

Fig. 2 is a plan view of the first car of the train and a portion of the second.

Fig. 3 is a plan view, partly broken away, showing the second car of the train and portions of the first and third.

Fig. 4 is a transverse section through the second car of the train.

Fig. 5 is an enlarged detail view of a pair of the splice compressing rolls.

Fig. 6 is a section on the line 6—6 of Fig. 5.

Fig. 7 is a side view of one of the wire reel supports showing a reel of wire thereon.

Fig. 8 is an end view of the device shown in Fig. 7, the wire being removed.

Fig. 9 is a cross section through the third car of the train showing the erecting crane.

Fig. 10 is a section on the line 10—10 of Fig. 9.

Fig. 11 is a view showing the plan of the crane carrying car.

Fig. 12 is a cross section through the fourth or ladder carrying car of the train.

Fig. 13 is an enlarged detail front view of an insulator equipped with the automatic clamp used herewith.

Fig. 14 is a similar view showing a portion of an insulator in a second or clamping position.

Fig. 15 is a view taken at right angles to Fig. 14.

In carrying out the objects of the invention and in the form of the device disclosed there is provided a train of flat cars consisting of the cars A, B, C, and D each of which carries a proper portion of the apparatus.

The car A is divided into two portions by means of a partition 10 and in the forward portion there are stored the wire reels 11. In the rear portion of the car A is a series of wire reel supports arranged transversely of the car and each of these supports consists of a standard 12 whereon is pivoted a shaft 13, the shaft 13 being provided with a lug 14 engageable with a pin 15 carried on the standard 12 so that when the shaft 13 is thrown upward to loading position the engagement of the pin by the lug will hold it from falling too far over. In connection with the standard 12 and shaft 13 there is also provided a supporting standard 16 the upper end of which lies in the path of the free end of the shaft 13 and is provided with a notch 17 for the reception of this free end. Moreover on one side of the standard 16 is secured a strap 18 to which is hinged a J-shaped strap 19 having an opening in its free end to receive a pin 20 projecting from the standard 16. Thus when the shaft 13 is in position on the standard 16 the strap 19 may be thrown over as shown in Fig. 8 and engaged with the pin 20 to hold the shaft from jumping up. In alinement with each of the wire reels 21, which are held on the shafts 13, are the roller guides 22 and at the end of the car are supported guide plates 23 through which the wires 24 from the reels 21 pass.

On the car B is mounted the splice rolling devices and these splice rolling devices consist of a frame having upper and lower members 25 and 26 between which are arranged pairs of rollers 27 provided with registering grooves 28, the rollers being vertically arranged as shown in Fig. 4. The frame 26 is mounted for swinging movement on a base 28' fixed firmly to the floor of the car B. The frame also supports journal bearings 29 wherein is carried a guide roller 30 beneath which pass the wires 24. This splice rolling frame is arranged substantially in the middle of the car so that space is left between the frame and the forward end of the car for the operators to stand and connect the wires either by a wrapped splice or by an eye splice as shown at 31 in Fig. 6. In any event the wires 24 pass between the rollers 27, the rollers being normally idle. When, however, a splice is drawn between these rollers then the rollers will rotate and the splice being positively drawn between them will be compacted.

On the third car of the train is arranged a turn table 32 projecting upward from which are housings 33 supporting a shaft 34 whereon is fixed a crane arm 35 provided with a suitable counterbalance 36. On the shaft 34 is also provided a gear wheel 37 wherewith meshes a pinion 38 operated by a crank 39 so that by rotating the crank 39 an operator may raise or lower the crane arm 35 and by turning the crank on the turn table may swing the arm so that it will either lie longitudinally of the car or project laterally therefrom as desired. Depending from the free end of the crane arm are links 40 whereto is connected a frame 41 consisting of upper and lower members between which are swiveled guide eyes 42, the frame being regulated in position by means of a suitable guy rope 43 as seen in Fig. 9.

On the fourth or rear car of the train is provided a turn table 44 whereon is mounted a flying ladder 45 controlled by means of gearing 46 and a crank 47, this ladder being, like the crane arm, movable into lateral or longitudinal position relative to the car and thus being capable of being housed within the limits of the train.

In connection with these devices a peculiar clamping arrangement is essential in order that the train may pass quickly along and yet lock the wires to each of the poles. In order to provide this clamping arrangement each pole such as indicated at 48 has the usual cross arm 49 whereon are pins 50 carrying insulators 51. Surrounding the bottom of each of these insulators is a band 52 having projections which turn up as at 53 around the lower edge of the petticoat of the insulator. Projecting upward from the band 52 is an arm 54 to the upper end of which is pivoted a clamping member or latch 55. Having its lower end fixed to the band 52 is a compression spring 56 the upper end of which engages a projection or lug 57 on the clamping member 55. This lug is so arranged that when the parts are in the position shown in Fig. 13 a line drawn through the center of the spring 56 will lie between the pivot pin 58 and the insulator while, when the parts are in the position shown in Fig. 14 this line will lie outside of the pivot point of the insulator. The member 55 is also provided with a projection 59 upon which the wire 24 engages when the parts are in the position shown in Fig. 13. It will be obvious that if the wire engages in this position and a downward pull is effected on the wire 24 the clamping device will be tripped so that it will jump from the position of Fig. 13 to the position of Fig. 14 and by reason of its roughened or corrugated surface 60 will grip the wire 24 in the groove 61 of the insulator.

In the general operation of the device a suitable number of the reels 11 are placed in the position shown at 21 and the wires from these reels led through the guides and rollers 27 so that they can then be passed through the swiveling rings 42. The crane arm 35 is swung out to one side as in Fig. 9 and it is to be noted that the rings 42 are spaced equally with the insulators 51. When the ends of the wires have been fastened manually to one set of the insulators the crane arm 25 is raised so that the frame 41 will pass over the tops of the poles and the train started along the track. The wire will unreel from the reels 21 and as the frame 41 passes over the insulators of the next pole the different wires will drop into position as shown in Fig. 13. The crane arm 35 may then be lowered so that the clamps will snap into position as shown in Fig. 14 and thus lock the wires on the pole. At any time that a wire does not fall properly into position the ladder 45 may be utilized to place the wire in position, the train being of course stopped. It will be obvious that in many instances the weight of the wires will be sufficient to snap down the clamps, but the crane arm 35 may at any time be raised or lowered to effect clearing of the tops of the poles 48 and engagement properly of the wires by the clamps.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new is:—

1. The combination with a movable carrier, of a plurality of reel supports arranged transversely of the carrier, a swinging crane on the carrier, a guide arm carried by the swinging crane and having a plurality of guides to carry the wire strands fed from reels carried on the reel supports, means to control said guide arm, and a bank of guide devices interposed between the reel supports and the crane, said guide devices also acting as compressing devices to compact the splices in the wire strands.

2. In combination, a telegraph pole, a cross arm on said pole, wire clamps fixed in spaced relation on the cross arm, and adapted to be operated by the action of pulling wire strands downwardly thereacross, a traveling crane, a guide arm carried by the crane and provided with wire guides spaced equally with the wire clamps, means to cause the raising and lowering of the wires and reel supports traveling with said crane.

3. In combination, a telegraph pole, a cross arm on said pole, wire clamps fixed in spaced relation on the cross arm, and adapted to be operated by the action of pulling wire strands downwardly thereacross, a traveling crane, a guide arm carried by the crane and provided with wire guides spaced equally with the wire clamps, and means to raise and lower the guide arm to bring wires passing through the guides on said arm above and below the wire clamps.

In testimony whereof I affix my signature.

THEODORE TURANYCZ.

Witnesses:
L. SHAPPERT,
ALBERTA OUTWATER.

Copies of this patent may be obtained for five cents each, by addressing the "Commissioner of Patents, Washington, D. C."